United States Patent [19]
Reighard et al.

[11] Patent Number: 5,423,569
[45] Date of Patent: Jun. 13, 1995

[54] ELECTRIC SIGNALLING IN A SUPPLEMENTAL PASSENGER RESTRAINT SYSTEM

[75] Inventors: Robert P. Reighard, Petersburg; Mark Shermetaro, Rochester; Kenneth K. Ritter, Temperance; Paul R. Chandler, Saline, all of Mich.

[73] Assignee: United Technologies Automotive, Inc., Dearborn, Mich.

[21] Appl. No.: 148,608

[22] Filed: Nov. 3, 1993

Related U.S. Application Data

[63] Continuation of Ser. No. 960,226, Oct. 13, 1992, abandoned, which is a continuation-in-part of Ser. No. 726,455, Jul. 8, 1991, abandoned.

[51] Int. Cl.⁶ .................. B60R 21/16; H01H 9/00
[52] U.S. Cl. .................. 280/731; 200/61.54
[58] Field of Search ............ 280/748, 750, 728 B, 280/731; 200/61.54–61.57

[56] References Cited

U.S. PATENT DOCUMENTS

| | | | |
|---|---|---|---|
| 3,911,391 | 10/1975 | Held et al. | 280/735 |
| 3,953,830 | 4/1976 | Williams | 200/61.54 |
| 4,575,117 | 3/1986 | Uchida | 200/61.54 |
| 4,934,735 | 6/1990 | Embach | 200/61.54 |
| 5,002,306 | 3/1991 | Hiramitsu et al. | 200/61.54 |
| 5,062,661 | 11/1991 | Winget | 280/731 |
| 5,069,477 | 12/1991 | Shiraki | 280/728 B |
| 5,085,462 | 2/1992 | Gualtier | 280/731 |
| 5,265,904 | 11/1993 | Shelton et al. | 280/731 |
| 5,265,905 | 11/1993 | Shelton | 280/731 |
| 5,269,559 | 12/1993 | Filion et al. | 280/728 |
| 5,308,106 | 5/1994 | Heidorn | 280/728 B |

FOREIGN PATENT DOCUMENTS 0176659  4/1986  European Pat. Off. ............ 200/600
1301461 12/1989  Japan .

Primary Examiner—Margaret A. Focarino
Assistant Examiner—Paul N. Dickson
Attorney, Agent, or Firm—William W. Habelt

[57] ABSTRACT

A horn or other electrical sccessory is actuated by a flexible, pressure sensitive electric signal generating means such as a piezoelectric element, provided in the soft, flexible cover of a vehicle driver's side supplemental restraint system.

12 Claims, 3 Drawing Sheets

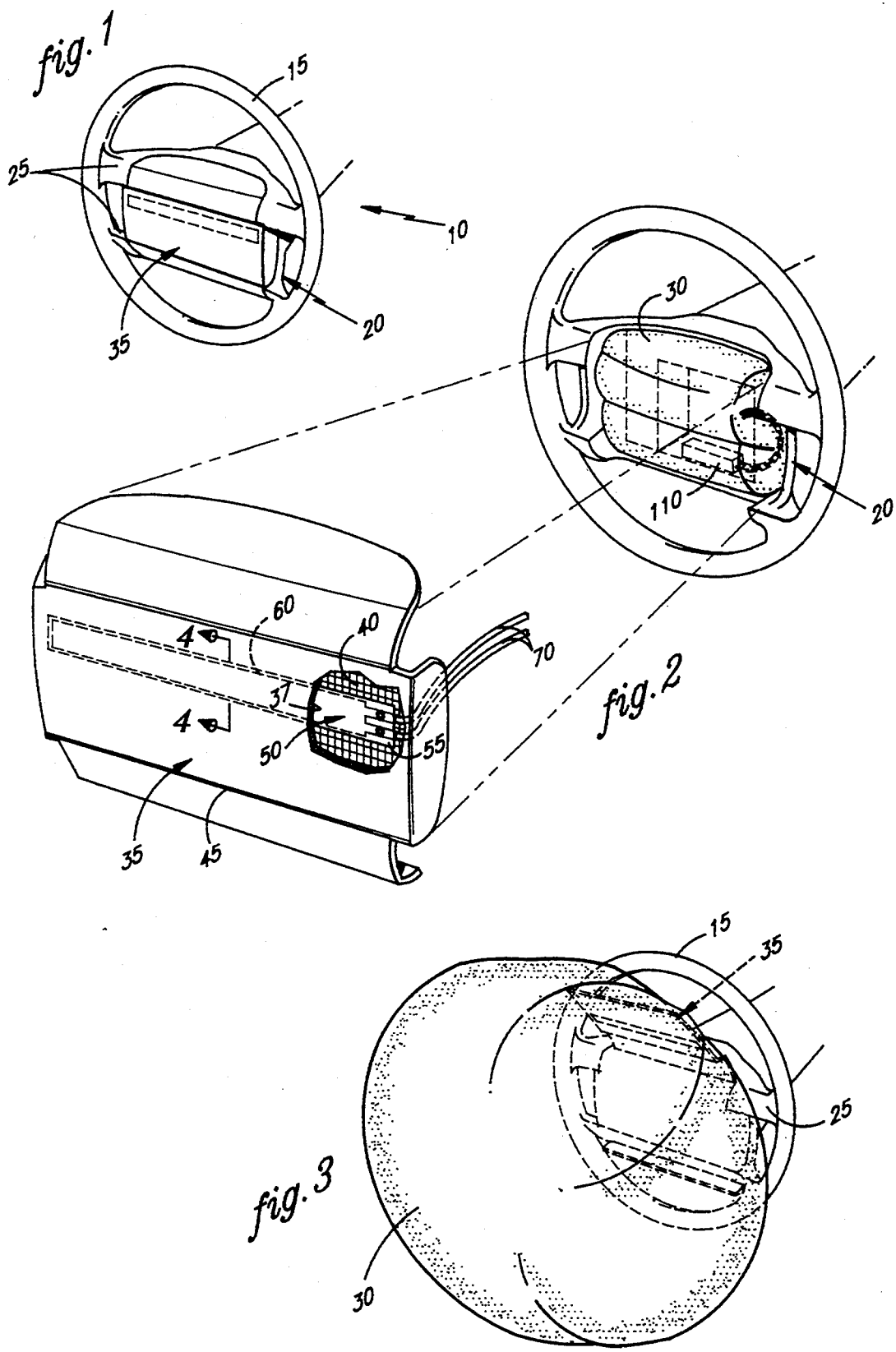

ELECTRIC SIGNALLING IN A SUPPLEMENTAL PASSENGER RESTRAINT SYSTEM

This application is a continuation of application Ser. No. 07/960,226, filed Oct. 13, 1992, abandoned, which is a continuation-in-part of application Ser. No. 07/726,455, filed Jul. 8, 1991, abandoned.

TECHNICAL FIELD

This invention relates generally to the actuation of an automobile's electrical accessories from the vehicle's steering wheel and particularly to a steering wheel equipped with a supplemental passenger restraint (airbag) system.

BACKGROUND ART

In the evolution of automotive design, great importance has recently been placed on automotive safety and ergonomics. Modern automobiles are provided with many safety systems to protect both the vehicle itself and its passengers in the event of a collision. Among such safety systems is the supplemental passenger restraint system for the front seat occupants of the vehicle. This system often times referred to as an airbag system, is provided in the hub of the steering wheel for the vehicle driver and occasionally, at the right hand end of the vehicle's instrument panel for the front seat passenger.

In the case of the driver's side supplemental restraint system, the hub of the steering wheel houses an airbag, a rapidly combustible material which when burned, gives off gasses which inflate the bag and an ignition system for initiating the combustion. The hub is covered by a soft, frangible, flexible cover which tears open under the force of airbag inflation, thereby allowing the bag to fill the area of the passenger compartment between the driver and the steering wheel as the bag inflates. The flexibility of the cover contributes to the frangibility thereof, provides a soft shock absorbing surface to reduce the risk of injury during minor incidents in which the airbag does not deploy, and provides an aesthetically pleasing extension of the colors and textures employed in other parts of the vehicle's passenger compartment.

One of the primary goals of modern ergonomic vehicle design is to provide controls which are conveniently accessible to the driver with a minimum of diversion of the driver's attention from the road. Since the vehicle's accessories are for the most part manually actuatable and operable, such accessories are conveniently operable from the steering wheel itself. Historically, horn buttons (switches) were positioned at the center of the steering wheel and studies have shown that drivers which are not completely familiar with the operation of a vehicle will instinctively reach for the center of the steering wheel when they wish to operate the horn. However, prior art horn buttons which employ hard mechanical components therein are not conducive for use with steering wheels having flexible airbag covers. Thus, automotive interior designers have been forced to move horn buttons to the spokes of the steering wheel and in some cases, to stalks extending outwardly from the steering column. Both locations have been found to be more inconvenient from the standpoint of the driver, than the center of the steering wheel. Furthermore, as time goes on, automobiles are provided with ever greater numbers of electrical accessories. Present day automotive designers continue to look to the steering wheel as a location for mounting the switches and controls for such accessories. By way of example, U.S. Pat. No. 4,628,310 to Reighard, et al discloses a multi-function steering wheel which includes controls for such accessories as headlights, windshield wipers, cruise control and the like. Clearly, such large numbers of accessory switches and controls cannot be accommodated within the limited area of the steering wheel spokes.

For safety reasons, the switches and controls for such accessories, are unsuitable for use with steering wheels provided with the soft supplemental restraint system cover. Hard components would seriously compromise any ability of the steering wheel cover to protect the driver from impact injuries and indeed could actually cause injury if fragmented or released as projectiles from the airbag cover upon deployment of the airbag.

Certain prior art airbag systems have been mounted above a conventional horn switch so that when it is desired to actuate the horn, the entire airbag system is depressed. Such a system requires rather large clearances between the movable airbag system and the steering wheel hub to minimize the risk of interference to the required movement of the components. Such clearances contribute to the complexity of the system and detract aesthetically therefrom.

Accordingly, an improved scheme for providing control signals to electrical accessories within the environment of a steering wheel provided with a supplemental restrain system, is desirable. Any apparatus employed in such a scheme must be required to withstand the extreme temperatures encountered in automotive interiors and should be sensitive enough to respond to moderate input forces, yet not so sensitive as to produce false signals in response to normal vibration or temperature changes.

DISCLOSURE OF INVENTION

In accordance with the present invention, a flexible steering wheel hub cover is provided with a flexible pressure sensitive signalling means which provides an electrical output signal when the vehicle operator presses on the cover. An amplifier, or electronic switch electrically connected to the output of the signalling means applies the signal for use as an input signal to an electrical accessory such as a horn, cruise control, windshield wiper or headlights. In the preferred embodiment, the signalling means comprises a piezoelectric element which generates an electrical signal in response to deformation thereof due to a force applied thereto by the driver's hand. In this case, the amplifier is provided with a latching means for maintaining the output signal for a predetermined time such that very brief changes in deformation of the piezoelectric element produce electrical signals of useful period. Preferably, the amplifier is located in close proximity to the piezoelectric element, that is, within the hub of the steering wheel to minimize the unwanted effects of electromagnetic background noise and signal attenuation from the inherent resistance of the system circuitry. The piezoelectric element is preferably located on one side or the other of a scored or weakened area in the cover along which the cover tears upon deployment of the airbag.

In an alternate embodiment, the flexible pressure sensitive signalling means comprises a force sensing resistor embedded in the cover. Pressing on the airbag cover lowers the resistance of the resistor. The resistor is electrically connected to an electronic switch in such a way that lowering the resistance of the resistor causes the switch to pass current to the vehicle horn.

In yet another embodiment, the flexible pressure sensitive signalling means comprises a membrane switch which may operate an electronic switch in a way similar to that of the force sensing resistor or alternatively, pass current directly to the horn.

BRIEF DESCRIPTION OF THE DRAWINGS

FIG. 1 is a perspective view of a vehicle steering wheel of the type in which the present invention is employed;

FIG. 2 is an enlarged view similar to FIG. 1 but partially exploded and broken away to snow details of construction of the present invention;

FIG. 3 is a perspective view similar to FIG. 1 but showing a cover of the steering wheel, frangibly open as a result of deployment of an airbag disposed within the hub of the steering wheel;

BEST MODE FOR CARRYING OUT THE INVENTION AND INDUSTRIAL APPLICABILITY THEREOF

Figure 5:
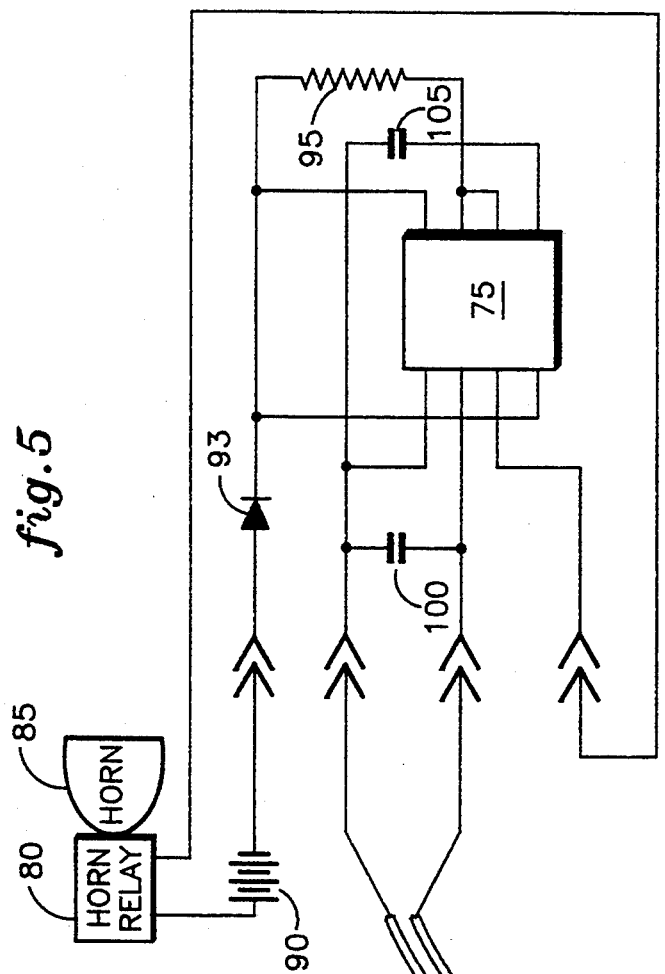
FIG. 5 is a circuit diagram of the present invention connected to the electrical system of a vehicle.

Referring to FIGS. 1 through 3, a modern vehicle steering wheel is shown generally at 10 and comprises a round rim 15 and a hub 20 supported within the rim by spokes 25. Typically, the steering wheel is formed by molding a synthetic plastic of requisite hardness and strength around a metallic frame. However, the structural details of the wheel itself are not important to an understanding of the present invention.

The wheel hub comprises a compartment which houses a driver's side supplemental restraint (airbag) system. As is well known, and is set forth hereinabove, the airbag system comprises the bag itself 30 shown in a folded and stowed configuration in FIG. 2, a combustible material (not shown) which when burned, releases gases which quickly fill the bag and an electronic or electromechanical system (not shown) for igniting the combustible material. The system is enclosed in the steering wheel hub by soft frangible cover 35. In the event that vehicle deceleration sensors employed with the system detect a sudden vehicle deceleration as would be the case in the event of a front end collision, the sensors provide a suitable signal to the ignition device which ignites the combustible material, thereby inflating the airbag. As the airbag inflates, it expands out of the vehicle hub causing cover 35 to tear open thereby allowing the airbag to expand into the passenger compartment between the driver and the steering wheel to cushion impact of the driver with the steering wheel or instrument panel as the vehicle comes to a halt. See FIG. 3.

Figure 4:
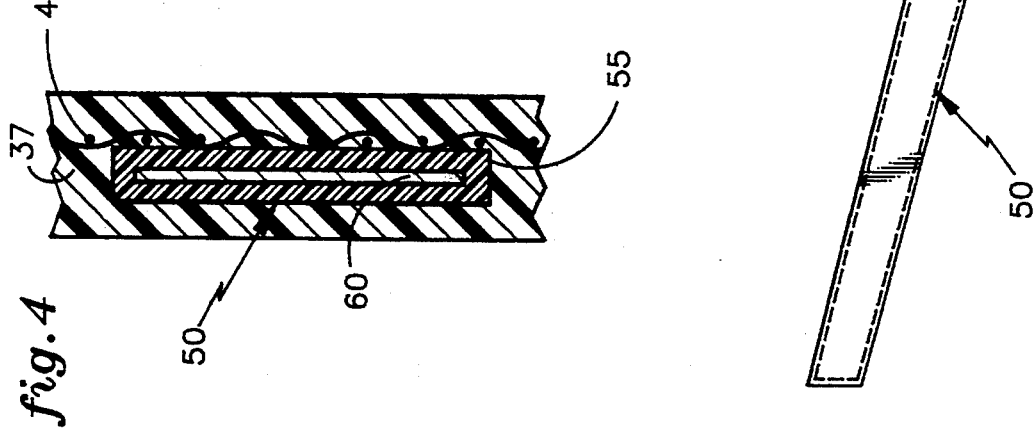
FIG. 4 is a sectional view taken along line 4—4 of FIG. 2.

The details of cover 35 are best shown in FIGS. 2 and 4. Cover 35 comprises a self-skinning dense, urethane foam 37 with a reinforcing mesh or scrim 40 molded therein. The cover includes a weakened or scribed tear seam 45 wherein the dense urethane foam is of a reduced thickness. The cover opens along tear seam 45 under the influence of the inflation of the airbag. The scrim may be cut along the area of the tear seam prior to molding the urethane foam to further enhance controlled tearing. Also molded into the cover parallel to the tear seam and displaced radially therefrom is a chorally oriented piezoelectric element 50 comprising an outer sheath of protective plastic 55 covering a layer of piezoelectric polymer 60 to which wires 70 are connected.

As those skilled in the art will appreciate, piezoelectric member 50, when subjected to pressure from the vehicle driver pushing on the cover, emits a low voltage electrical signal which may be used to activate the vehicle's horn or if so desired, other electric accessories. Piezoelectric member 50 may be of any suitable material which will produce a suitable signal when pressed on with a predetermined force. One such material is polyvinylidene difluoride (PVDF) sold under the trademark Kynar ® by Pennwalt Corp., Valley Forge, Pa. Other suitable piezoelectric are sold in film form by Atochem North America, Naperville, Ill. Such piezoelectric materials are sensitive enough to produce a useful output signal in response to sufficient pressure exerted anywhere on the cover. However, they are not so sensitive as to produce an output signal in response to very slight or very slowly applied pressures or pressures associated with changes in the vehicles' interior temperature.

Referring to FIG. 5, which illustrates the connection of the piezoelectric element 50 to the electrical system of the car, the element is connected to integrated circuit 75 which comprises an amplifier and a latch circuit. The amplifier amplifies the output of piezoelectric element 50 to provide a signal of sufficient amplitude to be used in the actuation of horn relay 80 and in turn horn 85. The horn relay is connected to the vehicle's battery 90 which, as charged by the vehicle's alternator, represents the primary vehicle power supply. Integrated circuit 75 also includes a latching circuit which maintains the amplifier output signal to the horn relay for a predetermined minimum period of time so that a horn note of a useable period of time will be produced even if the piezoelectric element is pressed only very briefly. Integrated circuit 75 may comprise any of various commercially available circuits in chip form. In the preferred embodiment, integrated circuit 75 comprises model NE555 Circuit by Harris Semiconductor. Diode 93 connected in series with the battery assures unidirectional current flow while resistor 95 connected in series with the diode, and a capacitor 100 set a maximum time limit of the amplifier output signal and thus horn tone in the event of a malfunction in the system. A second capacitor 105 is provided for noise suppression. When the integrated circuit identified hereinabove is employed, the various electrical components shown in FIG. 5 are connected in accordance with the numbering of the integrated circuit pins illustrated in FIG. 5. The capacitors, diode and resistor along with integrated circuit 75 are preferably hardwired to a printed circuit board (not shown) which is sealed by potting material or the equivalent for the mechanical protection thereof and housed within the hub of the wheel as illustrated at 110 in FIG. 2.

Figure 7:
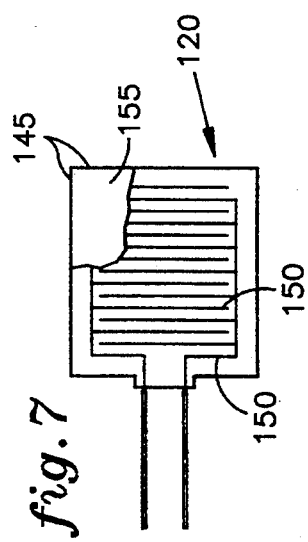
FIG. 7 is a plan view of one of the force sensing resistors shown in FIG. 6.
Figure 9:
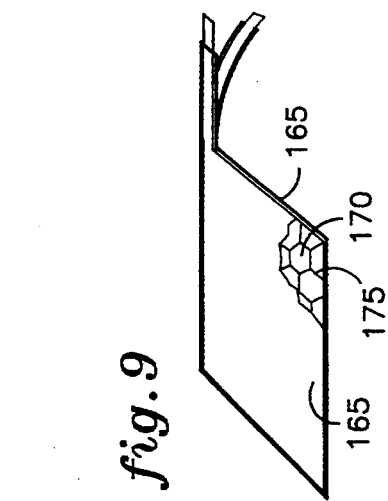
FIG. 9 is a perspective view of a membrane switch shown in FIG. 8, partially broken away to show the detailed construction thereof.
Figure 6:
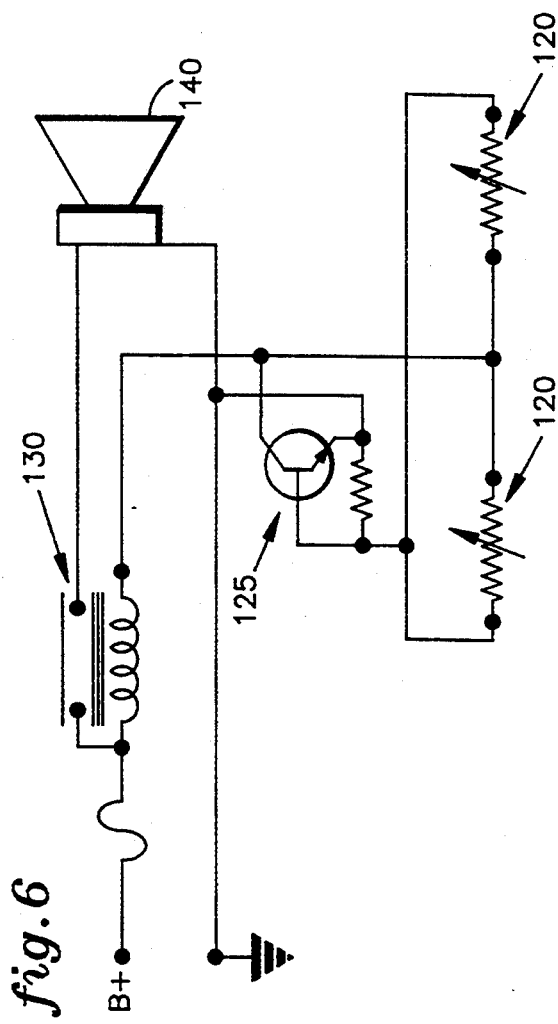
FIG. 6 is a circuit diagram of an alternate embodiment of the present invention of employing a force sensing resistor in place of a pizoelectric element shown in FIG. 4.

Referring to FIG. 6, an alternate embodiment of the present invention is shown wherein the flexible pressure sensitive signalling means comprises at least one force sensing resistor 120 connected to the base of a single transistor (electronic) switch 125. When the airbag cover is pressed, the resistance in the force sensing resistor decreases causing the base of the transistor to conduct. This in turn causes current flow through the collector and horn relay 130 to close thereby energizing horn 140 connected through the relay to the vehicle's battery indicated as power supply B+. While any type of force sensing resistor capable of being embedded (molded into) the airbag cover will suffice, in the preferred embodiment, the force sensing resistor comprises a pair of polymer sheets 145, one coated with a number of interdigitating electrodes 150 and the other coated with a semiconductive material 155 (FIG. 7). When force is applied to the force sensing resistor, the semiconductive material shunts the interdigitating electrodes thereby lowering the resistance of the resistor. Suitable force sensing resistors are manufactured and sold by Interlink Electronics of Carpinteria, Calif.

Figure 8:
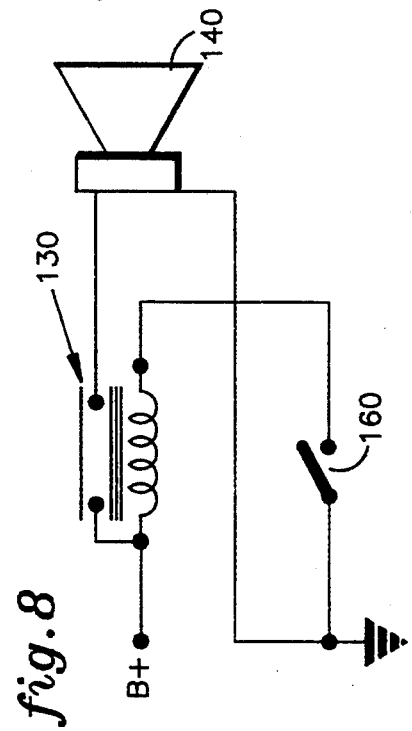
FIG. 8 is a circuit diagram of another alternate embodiment of the present invention.

Referring to FIG. 8, a circuit diagram similar to that of FIG. 6 is shown. However, in FIG. 8, force sensing resistors 120 have been replaced by a membrane switch 160 which closes when pressure is applied thereto from the vehicle operator pressing on the airbag cover. Closing the membrane switch completes a circuit between voltage source (battery) B+ and ground, through horn relay 130. As was the case in FIG. 6, energizing horn relay 130 operates horn 140. Any of various membrane switches may be employed. A suitable membrane switch comprises a pair of overlying polyester film layers 165 coated with a conductive polymer switching surface 170. The silver filled switching services are separated by a dielectric material 175 in a hexagonal honeycomb pattern. Pressing on the airbag cover applies pressure to the membrane switch thereby causing a deflection in the dielectric material, thus bringing the silver surfaces in contact with one another to operate the horn in the manner noted hereinabove. Such a membrane switch is manufactured and sold by ITW. Of course, it will be appreciated that where similar membrane switches having limited current handling capability are employed, a transistor switch such as that described hereinabove with respect to FIG. 6 may be employed.

While particular embodiments of the present invention have been shown, it will be readily apparent to those skilled in the art that various modifications thereto may be made without departing from the present invention. For example, while the present invention has been described within the context of horn actuation, it may be used with any of a variety of electrical accessories. Likewise, multiple piezoelectric elements, force sensing resistors and switches may be used in the airbag cover to actuate or control multiple accessories. While particular elements have been identified, other known equivalent elements may also be employed as may any of various other flexible, pressure responsive, electric signalling means known in the art. Such elements may be molded into the cover as shown and described or attached to a surface (preferably the inner) thereof. While a particular construction of the cover has been disclosed, as have various compositions of the components therein, various other structures and compositions may suggest themselves to those skilled in the art. It is intended that the following claims cover these and any other such modifications as may be employed without departure from the true spirit of the invention herein.

Having thus described the invention, what is claimed is:

1. In a supplemental passenger restraint system for a motor vehicle having a steering wheel, said restraint system being mounted within the hub of said steering wheel and comprising an inflatable bag disposed in said hub behind a frangible, flexible cover, said cover formed of a molded body having an outer surface and a reinforcing layer molded therein and having a tear seam formed in each of the molded body and the reinforcing layer along which said cover opens upon inflation of the bag, said motor vehicle further comprising an electrical power supply and an electrical accessory powered by said power supply, the improvement characterized by:
    said cover being provided with a flexible, pressure sensitive signalling means providing an output signal when said cover is flexed by pressing thereon by an operator of said vehicle, said signalling means being embedded within said cover between the outer surface of the molded body and the reinforcing layer and being oriented generally parallel to said tear seam and displaced therefrom; and
    means electrically connecting the output of said signalling means to said electrical accessory for applying thereto, said output signal of said signalling means.

2. The supplemental passenger restraint system of claim 1 characterized by said flexible pressure sensitive, signalling means comprising a piezoelectric element which generates said output signal during the deformation thereof in response to a force applied thereto, and said connecting means comprising an amplifier for amplifying said output signal of said piezoelectric element applied to said signalling means.

3. The supplemental passenger restraint system of claim 2 characterized by said piezoelectric element comprising a synthetic plastic.

4. The supplemental passenger restraint system of claim 3 characterized by said synthetic plastic comprising a polyvinylidene difluoride.

5. The supplemental passenger restraint system of claim 2 characterized by said amplifier including latching means for maintaining amplification of said output signal for a predetermined period of time subsequent to the termination of change in deformation of said piezoelectric element.

6. The supplemental passenger restraint system of claim 2 characterized by said amplifier being disposed within said steering wheel, proximally to said pressure sensitive signalling means for minimizing the effects on the operation of said amplifier of unwanted noise and unwanted signal attenuation.

7. The supplemental passenger restraint system of claim 1 characterized by:
    said connecting means comprising a normally non-conducting electronic switch; and
    said flexible pressure sensitive signalling means comprising a force sensing resistor, the inherent electrical resistance thereof being reduced in response to a force applied thereto from said flexible cover being pressure, resulting in energization of said electronic switch, thereby causing said electronic switch to become conductive and apply said output signal to said electrical accessory.

8. The supplemental passenger restraint system of claim 7 characterized by said electronic switch being disposed within said steering wheel, proximally to said force sensing resistor for minimizing the effects on the operation of said amplifier of unwanted noise and signal attenuation.

9. The supplemental passenger restraint system of claim 7 characterized by said force sensing resistor comprising a pair of overlying polymer sheets, a first of such polymer sheets being coated with interdigitating electrodes and the other being coated with a semiconductive material.

10. The supplemental passenger restraint system of claim 1 characterized by:
    said flexible, pressure sensitive signal generating means comprising a membrane switch.

11. The supplemental passenger restraint system of claim 10 characterized by:
    said membrane switch comprising a pair of overlying polyester film layers;
    each of said layers being coated on an interior surface thereof with a conductive polymer switching surface;
    said conductive polymer switching surfaces being separated by a dielectric material.

12. A hub cover for a steering wheel in a motor vehicle, the steering wheel having a hub and an inflatabale air bag supplemental restraint system mounted within the hub, said cover comprising:
    a molded body having an outer surface and a reinforcing layer molded therein, each of the molded body and the reinforcing layer having a tear seam formed therein along which said cover opens upon inflation of the air bag; and
    a flexible, pressure sensitive signalling means for providing an electrical output signal when said cover is flexed by pressing thereon by an operator of said vehicle, said signalling means being embedded within said cover between the outer surface of the molded body and the reinforcing layer and being oriented generally parallel to said tear seam and displaced therefrom.

* * * * *